United States Patent [19]
Rippel

[11] Patent Number: 5,904,032
[45] Date of Patent: May 18, 1999

[54] METHOD AND MEANS FOR HARVESTING GRAIN

[76] Inventor: Alan W. Rippel, 822 Grand Ave., Ames, Iowa 50010

[21] Appl. No.: 08/876,918

[22] Filed: Jun. 16, 1997

[51] Int. Cl.[6] .............................. A01D 34/40; A01D 34/04
[52] U.S. Cl. .............................. 56/14.6; 56/16.5; 56/122; 56/DIG. 5; 460/119
[58] Field of Search ..................................... 56/14.6, 13.3, 56/16.5, 16.6, 122, 14.5, DIG. 5; 460/119, 111, 112, 21, 114

[56] References Cited

U.S. PATENT DOCUMENTS

| | | |
|---|---|---|
| 2,648,943 | 8/1953 | Shafer et al. . |
| 2,751,743 | 6/1956 | Bauer . |
| 3,141,281 | 7/1964 | Gaunt et al. . |
| 3,325,982 | 6/1967 | Fogels et al. . |
| 3,399,517 | 9/1968 | Magee . |
| 3,434,271 | 3/1969 | Gaunt et al. . |
| 3,513,646 | 5/1970 | Johnston et al. . |
| 4,270,550 | 6/1981 | Da Silva ................................. 56/14.6 |
| 4,373,536 | 2/1983 | Da Silva . |
| 5,305,586 | 4/1994 | Lundahl et al. . |
| 5,433,065 | 7/1995 | Mosby . |

*Primary Examiner*—Heather Shackelford
*Attorney, Agent, or Firm*—Zarley, McKee, Thomte, Voorhees & Sease

[57] ABSTRACT

A method of harvesting grain involves placing a cutting and harvesting head on the front of a prime mover, moving the prime mover and the head through a field of mature grain plants with grain thereon. The grain bearing plants are then cut with the head, and then moved to a grain separating station on the head. The grain is then separated from the plants within the head, captured, and then moved to a grain reservoir on the prime mover. The severed plants are then deposited into the field after the grain is separated therefrom. A combine or prime mover has a grain harvesting head on the forward end thereof. A cutter bar or the like is on the head to cut grain bearing field plants. A conveyor moves the cut plants to threshing elements on the head for separating grain from the severed plants. A grain conveyor on the head moves the grain to a grain reservoir on the combine. An exit port is on the head for depositing all of the plants in the head on the field from which the plants were cut.

6 Claims, 3 Drawing Sheets

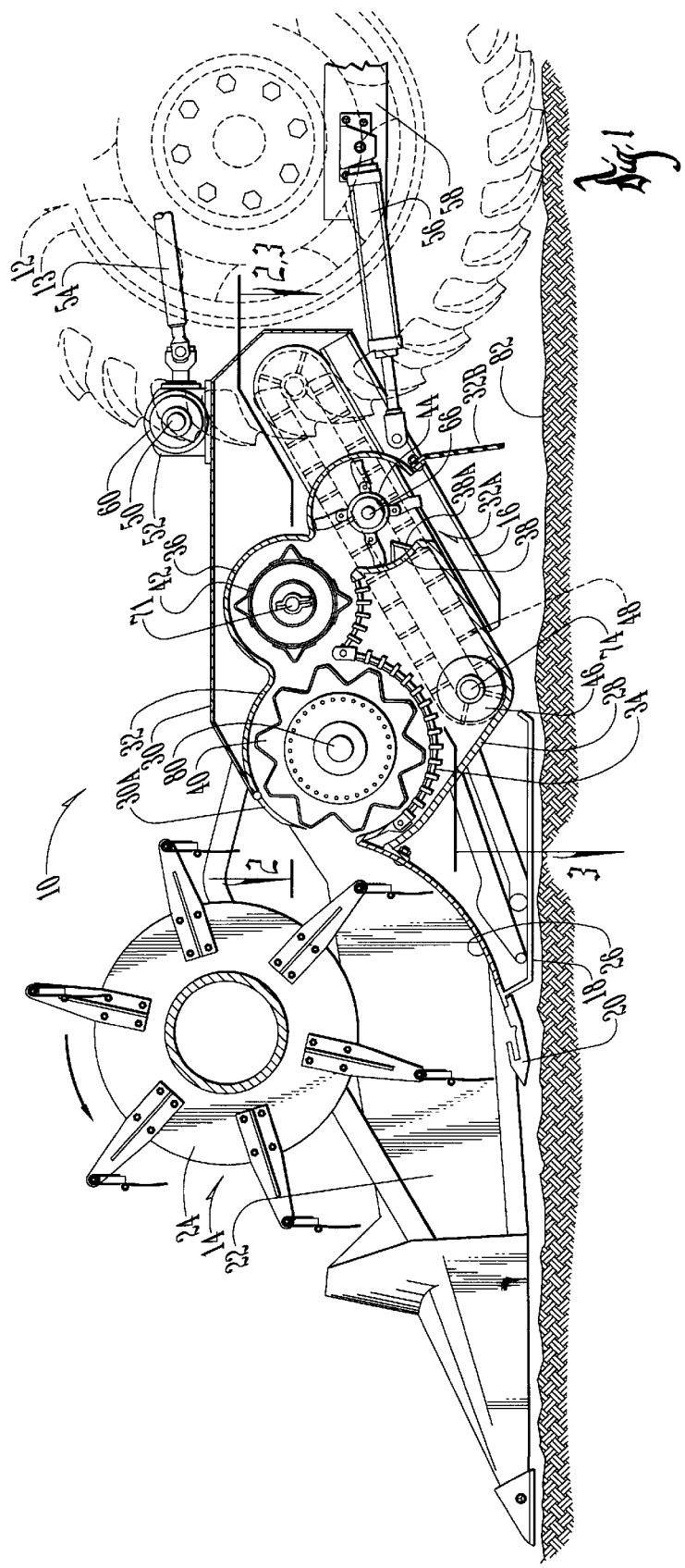

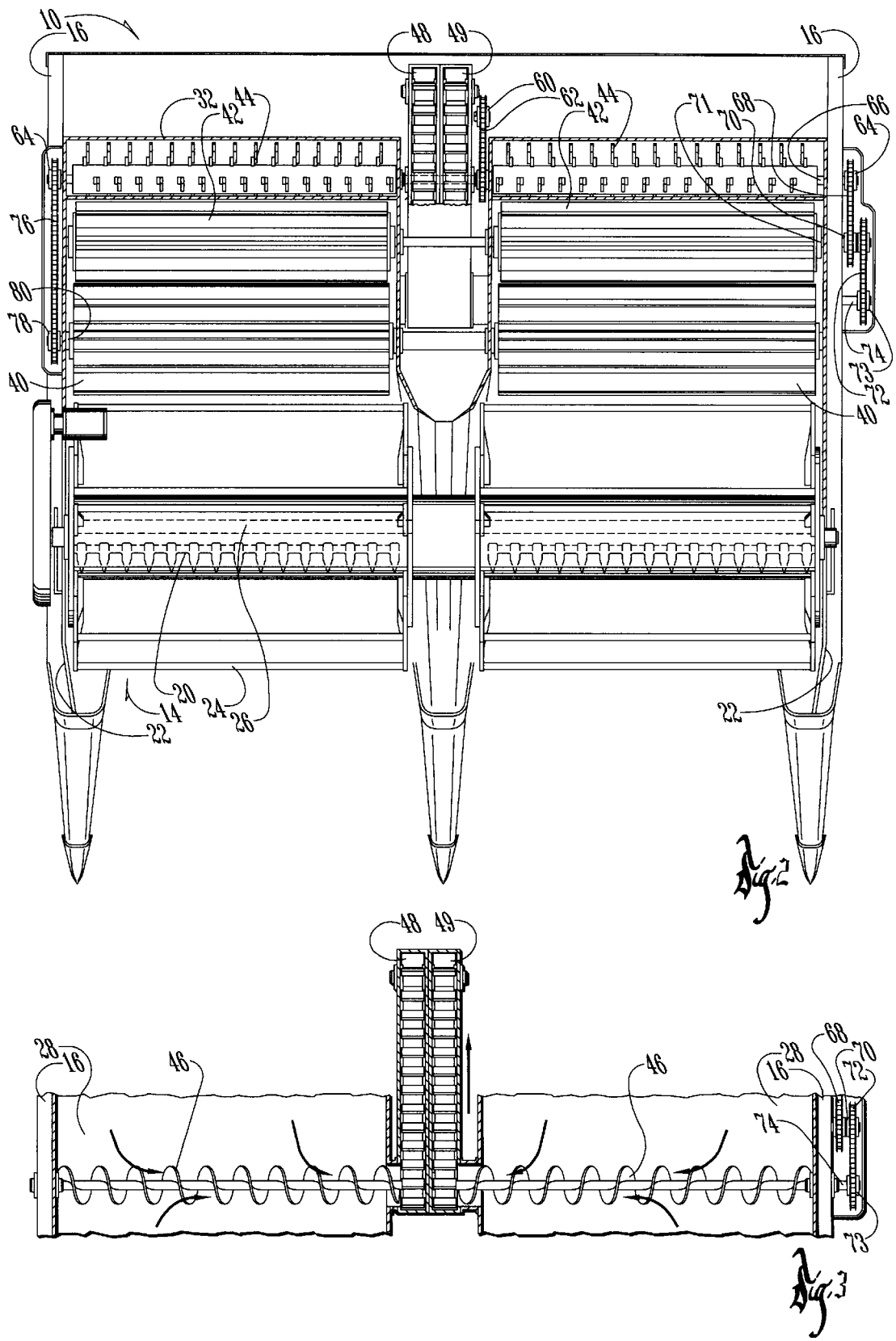

METHOD AND MEANS FOR HARVESTING GRAIN

BACKGROUND OF THE INVENTION

Machines for harvesting grain such as corn, soybeans, wheat, oats and the like are typically comprised of combines with an appropriate harvesting head detachably mounted on the front thereof. The combine is the prime mover of the machinery and powers the moving components on the head. The conventional machines normally use one type of head to harvest corn, and a different head to harvest soybeans, wheat, oats, and the like. However, all these heads have a plant cutting mechanism which severs the plants close to the ground level, and moves the cut plants to the combine where the grain is separated from the plants. The grain is gathered, cleaned, and conveyed to a grain reservoir, all within the combine. The plants from which the grain is severed are moved longitudinally through the combine, and deposited onto the surface of the field from the rearward end of the combine.

The mass of the severed plants represents tons of residue in a field of any size. Residue from corn plants is sometimes baled for roughage feed for cattle in bales weighing 1,500 to 2,000 pounds or greater. However, running this great quantity of severed plants through the combine is obviously a great burden on the combine which must provide the power to move the plants through the combine to a rearward point of deposit.

It is therefore a principal object of this invention to provide a method and means for harvesting grain wherein the grain is separated from the plant in the head instead of the combine, and the severed plants are deposited in the field from the head without moving through the combine.

These and other objects will be apparent to those skilled in the art.

SUMMARY OF THE INVENTION

A method of harvesting grain involves placing a cutting and harvesting head on the front of a prime mover, moving said prime mover and said head through a field of mature grain plants with grain thereon. The grain bearing plants are then cut with the head, and then moved to a grain separating station on the head. The grain is then separated from the plants within the head, captured, and then moved to a grain reservoir on the prime mover. The severed plants are then deposited into the field directly from the head after the grain is separated therefrom.

A combine or prime mover has a grain harvesting head on the forward end thereof. A cutter bar or the like is on the head to cut grain bearing field plants. A conveyor moves the cut plants to threshing elements on the head for separating grain from the severed plants. A grain conveyor on the head moves the grain to a grain reservoir on the combine. An exit port is on the head for depositing all of the plants in the head on the field from which the plants were cut.

BRIEF DESCRIPTION OF THE DRAWINGS

FIG. 1 is a partial longitudinal sectional view of a combine with a harvesting head of this invention mounted thereon;

FIG. 2 is a plan view of a harvesting head of this invention;

FIG. 3 is a sectional view taken on line 3—3 of FIG. 1; and

DESCRIPTION OF THE PREFERRED EMBODIMENT

Figure 4:
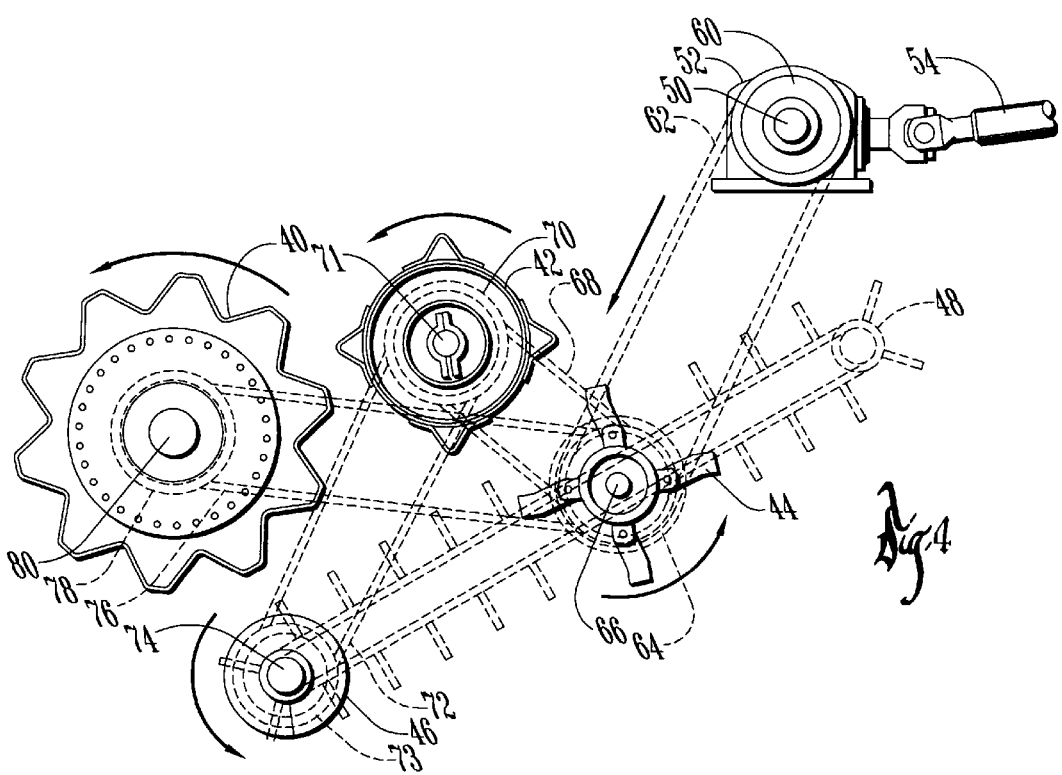
FIG. 4 is a side schematic view of the internal components of the harvesting head.

The harvesting machine 10 is comprised of a combine or prime mover 12 which is driven by wheels 13. A harvesting head 14 is mounted on the forward end of the combine.

A subframe 16 comprises a part of the harvesting head. A platform 18 is mounted on the forward edge thereof and a conventional cutter bar 20 is located on the forward end of the platform. Conventional side panels 22 (FIGS. 1 and 2) are located on the sides of the head 14 A conventional reel 24 is rotatably mounted on the head 14 and is adapted to move the plants to be harvested in towards the cutter bar 20 in conventional fashion. An arcuate panel 26 (FIG. 1) is located immediately rearwardly of the cutter bar 20 and facilitates the movement of the severed plants rearwardly into the head. The foregoing components are conventional in combine heads used for soybeans and the like, and the conventional power drives for various of these components have not been shown.

As seen in FIG. 1, a V-shaped housing floor 28 has its forward edge secured to arcuate panel 26 and extends downwardly and thence upwardly therefrom. An upper housing 30 has its lower rearward edge secured to subframe 16 of head 14 and extends upwardly and thence horizontally, and thence forwardly and downwardly and terminates in a hinged cover 30A. An upper subhousing 32 is secured to and extends rearwardly from upper housing 30 and hag three arcuate portions which terminate in an exit port 32 at the rearward end thereof (FIG. 1). A cover 32B is hingedly secured to the rearward end of subhousing 32 to close the exit port 32A if desired.

A conventional combine concave 34 is secured to the rearward end of arcuate panel 26 and is located within head 14. A smaller arcuate concave 36 is secured to the rearward end of concave 34. Similarly, a smaller wall 38 is secured to the rearward end of concave 36 with the other end being secured to housing floor 28. A conventional knife element 38A is secured to wall 38.

A conventional threshing cylinder 40 is positioned concentrically with concave 34. Similarly, a conventional beater 42 is concentrically mounted with respect to concave 36. In like manner, a conventional combine chopper 44 is mounted within head 14 and is concentrically located with respect to wall 38.

A conventional horizontal grain auger 46 is mounted in the bottom of housing floor 28 (FIG. 1). A conventional grain conveyor 48 (FIGS. 1 and 2) is mounted within housing floor 28 and extends upwardly and rearwardly within the head 14. A similar grain conveyor or elevator 49 (FIG. 2) extends upwardly in parallel relationship to conveyor 48 (FIG. 2) with conveyor 48 receiving grain delivered by the left-hand end of auger 46 (FIG. 3) and with conveyor 49 receiving grain delivered from the right-hand end of auger 46. See the arrows in FIG. 3 which show the direction of flow of grain to the conveyors 48 and 49.

As shown best in FIG. 4, the horizontal axis of shaft 50 of head 14 is the pivotal axis for head 14 and extends from gear box 52 mounted on the top of upper housing 30. A drive shaft 54 extending from a power source (not shown) on combine 12 extends into gear box 52 and provides a source of power to shaft 50 extending horizontally out of the gearbox 52.

A conventional lift cylinder 56 is attached to combine frame 58 (FIG. 1) to raise and lower the head 14 with respect to the combine 12 as desired.

A pulley 60 is mounted on shaft 50 and supports one end of belt 62 (FIG. 4). The other end of belt 62 embraces pulley 64 mounted on shaft 66 upon which the chopper 44 is mounted. A belt 68 (FIG. 4) extends from pulley 64 upwardly to pulley 70 which is mounted on shaft 71 which supports beater 42. Belt 72 extends from pulley 70 downwardly towards pulley 73 on shaft 74. Shaft 74 is the shaft of auger 46 and is the drive shaft for conveyors 48 and 49.

A belt 76 extends from the pulley 64 on shaft 66 and extends to the pulley 78 on shaft 80 which supports the threshing cylinder 40.

The numeral 82 in FIG. 1 designates the surface of a field in which grain bearing corn, soybean plants or the like are growing.

It should be understood that the concaves 34, 36; the threshing cylinder 40, beater 42, chopper 44, and auger 46; and various forms of conveyors 48 and 49 are normally located within the combine 12.

In operation, the combine or prime mover 12 moves the head 14 through the field wherein grain bearing plants exist. In the case of soybeans, wheat, oats or the like, the reel 24 draws the plants into contact with the reciprocating cutter bar 26 and sweeps the cut plants up the arcuate panel 26 into the area of the head between housing 32 and floor 28 to cause the plants to move between the threshing cylinder 40 and the concave 34. This action severs the grain from the plants and the grain moves through the conventional openings within concave 34.

The beater 42 performs its conventional function with respect to the severed plants and serves to complete the threshing action by further severing grain from the plants which passes through concave 36. The severed plants then move into contact with chopper 44, and then move through exit port 32A for deposit in the field surface 82.

As a result, the voluminous tonnage of the severed plants is quickly and immediately deposited within the field and is not cause to be conveyed through the combine 12.

With reference to FIGS. 2 and 3, the grain separated from the plants and passing through concaves 34 and 36 moves downwardly to the bottom of housing floor 28 and is moved horizontally by auger 46 to the central portion of the head 14. The grain captured by the left-hand end of auger 46 as seen in FIG. 3 moves onto conveyor 48. Similarly, the grain captured by the right-hand end of auger 46 moves towards the center of the head to be deposited on the lower end of conveyor 49. The separated grain is then carried upwardly on conveyors 48 and 49 for deposit on conventional cleaning or shaker elements within the combine and for ultimate deposit in grain reservoir tanks (not shown).

When harvesting corn, conventional harvesting components other than reel 24 and cutter bar 20 are used, and the separated grain bearing corn plants are moved rearwardly to be treated by threshing cylinder 40, beater 42, and chopper 44 in the manner described above. It is thus seen that this invention will achieve its principal object by substantially completing the harvesting operation within the confines of the head 14 without having to move the vast bulk of the severed plants through the combine.

What is claimed is:

1. A method of harvesting grain, comprising, detachably placing a cutting and harvesting head on the front of a prime mover so that the prime mover is positioned rearwardly of the head, moving said prime mover and said head forwardly through a field of mature grain plants with grain thereon, cutting said plants with said head and moving said cut plants rearwardly to a grain separating station on said head, separating said grain from said plants within said head, capturing said grain which is separated from said plants within said head and moving the same rearwardly to a grain reservoir on said prime mover, and depositing all of the plants from said head directly onto said field forwardly of the prime mover after said grain is separated therefrom.

2. The method of claim 1 wherein said plants are chopped into small plant particles within said head before being deposited in said field.

3. The method of claim 1 wherein said plants are cut by said head at an elevation adjacent to the level of said field so that a substantial portion of said plants will pass into said head.

4. The combination of a prime mover having a front end, and a grain harvesting head detachably mounted on the front end of said prime mover, comprising, a field plant cutter on said head forwardly of the prime mover and adapted to cut a plurality of grain bearing plants as said prime mover moves forwardly through a field in which grain bearing plants are growing, conveyor means on said head for moving plants cut by said cutter into said head, threshing elements in said head for separating grain from said plants moved into said head, grain conveying means on said head for receiving and rearwardy conveying grain separated from said plants to a grain reservoir on said prime mover, and an exit port on said head forwardly of the prime mover for depositing all of said plants in said head on the field from which said plants are cut.

5. The combination of claim 4 wherein said head is detachably secured to said prime mover.

6. The combination of claim 4 wherein a chopper is mounted in said head to chop into small particles the plants within said head before being deposited in said field.

* * * * *